(12) United States Patent
Lee et al.

(10) Patent No.: US 8,477,660 B2
(45) Date of Patent: Jul. 2, 2013

(54) METHOD FOR UPDATING FILTERING DATABASE IN MULTI-RING NETWORK

(75) Inventors: Kwang Koog Lee, Daejeon (KR); Jeong Dong Ryoo, Daejeon (KR); Sang Min Lee, Daejeon (KR); Dae Ub Kim, Daejeon (KR); Jea Hoon Yu, Daejeon (KR); Tea Whan Yoo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 418 days.

(21) Appl. No.: 12/785,898

(22) Filed: May 24, 2010

(65) Prior Publication Data

US 2010/0296416 A1    Nov. 25, 2010

(30) Foreign Application Priority Data

May 25, 2009  (KR) .......................... 10-2009-0045483
Dec. 18, 2009  (KR) .......................... 10-2009-0127520

(51) Int. Cl.
*H04L 12/28*      (2006.01)
(52) U.S. Cl.
USPC .......................................... 370/258; 370/452

(58) Field of Classification Search
USPC .................................................. 370/258, 225
See application file for complete search history.

(56) References Cited

U.S. PATENT DOCUMENTS

| 2009/0168646 A1* | 7/2009 | Wang et al. .................... 370/225 |
| 2010/0110881 A1* | 5/2010 | Ryoo et al. ..................... 370/225 |
| 2010/0165834 A1* | 7/2010 | Holness et al. ................ 370/225 |

* cited by examiner

*Primary Examiner* — Dang Ton
*Assistant Examiner* — Lionel Preval
(74) *Attorney, Agent, or Firm* — Staas & Halsey LLP (57) ABSTRACT

A method for updating a filtering database in a multi-ring network, includes: when the topology of a lower ring in a multi-ring network, in which a plurality of ring networks are connected by two ring connection nodes, is altered and the ring connection node detects the alteration in the topology of the lower ring, erasing, by the ring connection node, its filtering database; generating, by the ring connection node, a control message including a ring ID, a blockage flag, and an erasure flag; transmitting the control message in both directions of the ring; and determining, by a node which receives the control message, to erase a filtering database by referring to and correcting the blockage and erasure flag information included in the control message.

14 Claims, 5 Drawing Sheets

METHOD FOR UPDATING FILTERING DATABASE IN MULTI-RING NETWORK

CROSS-REFERENCE TO RELATED APPLICATIONS

This application claims the priorities of Korean Patent Application Nos. 10-2009-0045483 filed on May 25, 2009 and 10-2009-0127520 filed on Dec. 18, 2009, in the Korean Intellectual Property Office, the disclosures of which are incorporated herein by reference.

BACKGROUND OF THE INVENTION

1. Field of the Invention

The present invention relates to a method for updating a filtering database in a multi-ring network having a hierarchical structure and, more particularly, to a technique that prevents the indiscriminative erasure of a filtering database by utilizing a control message for updating the filtering database when the topology of a lower ring network is altered in a multi-ring network in which a plurality of ring networks are connected by two ring connection nodes, thus allowing for effective, rapid protection switching.

2. Description of the Related Art

An Ethernet ring network prevents loop formation when traffic is transferred, by blocking a predetermined particular port among several ports constituting a ring. When the Ethernet ring network is faulty, the blocked port is open, while the port having the fault is blocked, altering network topology. In this case, in general, every node belonging to the ring then erases a filtering database in order to transfer a packet, according to the altered network topology.

A multi-Ethernet ring network in which a plurality of Ethernet ring networks are connected to each other has a structure such that a major ring is positioned at an upper side and a sub-ring is positioned at a lower side. Another lower sub-ring may be connected to the sub-ring. In other words, sub-rings may be connected to a single major ring, and further sub-rings may be connected to the sub-rings connected to the major ring to thereby extend the network.

In a multi-Ethernet ring network according to the related art, when the topology of a sub-ring is altered due to a link fault and recovery, the filtering tables of respective nodes belonging to the topology-altered sub-ring and the filtering tables of respective nodes belonging to a sub-ring or a major ring positioned at an upper side of the topology-altered sub-ring are all erased.

In this case, each node learns a source address of a frame so as to update the filtering database, and if a frame has a destination which is a new address not recorded in the filtering database, each node duplicates the corresponding frame and transfers it to all of the ports, excluding a port from which the frame has been received. Thus, in an Ethernet ring network according to the related art, a larger amount of frames whose address are not recoded are transmitted and received than those in a normal state until such time as the source address is learnt by all of the nodes. Namely, the related art multi-Ethernet ring network protection switching technique has a problem, in that a transition phenomenon occurs as the amount of traffic, after protection switching, is overshot.

Thus, in order to avoid frame loss caused by the transition phenomenon, a link capacity or a bandwidth of the network must be secured at a level greater than is strictly necessary, which is, however, ineffective. Meanwhile, when the link capacity or the bandwidth of the network are limited, a large capacity buffer may be provided so as to avoid such a frame loss, but in this case, rapid protection switching, e.g., protection switching within the 50 ms required for a real time voice communications network, cannot be provided. Therefore, a technique allowing for rapid protection switching in the event of an occurrence of a failure in the multi-Ethernet ring network having a limited link capacity or bandwidth is required.

SUMMARY OF THE INVENTION

An aspect of the present invention provides a method for updating a filtering database in a multi-ring network capable of preventing an indiscriminate erasure of a filtering database by utilizing a control message for updating the filtering database when the topology of a lower ring network is altered in a multi-ring network in which a plurality of ring networks are connected by two ring connection nodes, thus allowing for effective, rapid protection switching.

According to an aspect of the present invention, there is provided a method for updating a filtering database in a multi-ring network, including: when the topology of a lower ring in a multi-ring network, in which a plurality of ring networks are connected by two ring connection nodes, is altered, and the ring connection node detects the alteration in the topology of the lower ring, erasing, by the ring connection node, its filtering database; generating, by the ring connection node, a control message including a ring ID, a blockage flag, and an erasure flag; transmitting the control message in both directions of the ring; and determining, by a node which receives the control message, to erase a filtering database by referring to and correcting the blockage and erasure flag information included in the control message.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In describing the present invention, if a detailed explanation for a related known function or construction is considered to unnecessarily divert the gist of the present invention, such explanation will be omitted but would be understood by those skilled in the art. In the drawings, the shapes and dimensions may be exaggerated for clarity, and the same reference numerals will be used throughout to designate the same or like components.

Before discussing a method for updating a filtering database in a multi-ring network according to an exemplary embodiment of the present invention, the protection switching of an Ethernet ring network will be described in brief.

An Ethernet ring network includes ring nodes providing a plurality of ports therein. Two of the ports of each ring node are used for a connection with adjacent ring nodes, while the remaining ports in each ring node are used for a connection with an Ethernet network outside the ring network.

In the Ethernet ring network, each ring node must create a filtering database such that a transfer of an Ethernet frame does not form an infinite loop. In order to prevent the formation of an infinite loop, a certain link called a ring protection link (RPL) may be logically blocked in the Ethernet ring network. In order to provide the logical blockage, the Ethernet ring network has a RPL owner node, and the RPL owner node logically blocks one of its ports, which is connected to the RPL, in order to prevent an infinite loop transmission.

When a link in the Ethernet ring network has an error, the error-generated link provides a physical blockage, so the RPL owner node quickly removes the logical blockage to provide connectivity to all of the nodes of the ring network as well as preventing an infinite loop transmission within the ring.

Meanwhile, the multi-Ethernet ring network refers to a network including a plurality of Ethernet ring networks as stated above, and each Ethernet ring network may be connected to other Ethernet ring networks by one or two ring connection nodes.

Figure 1A:
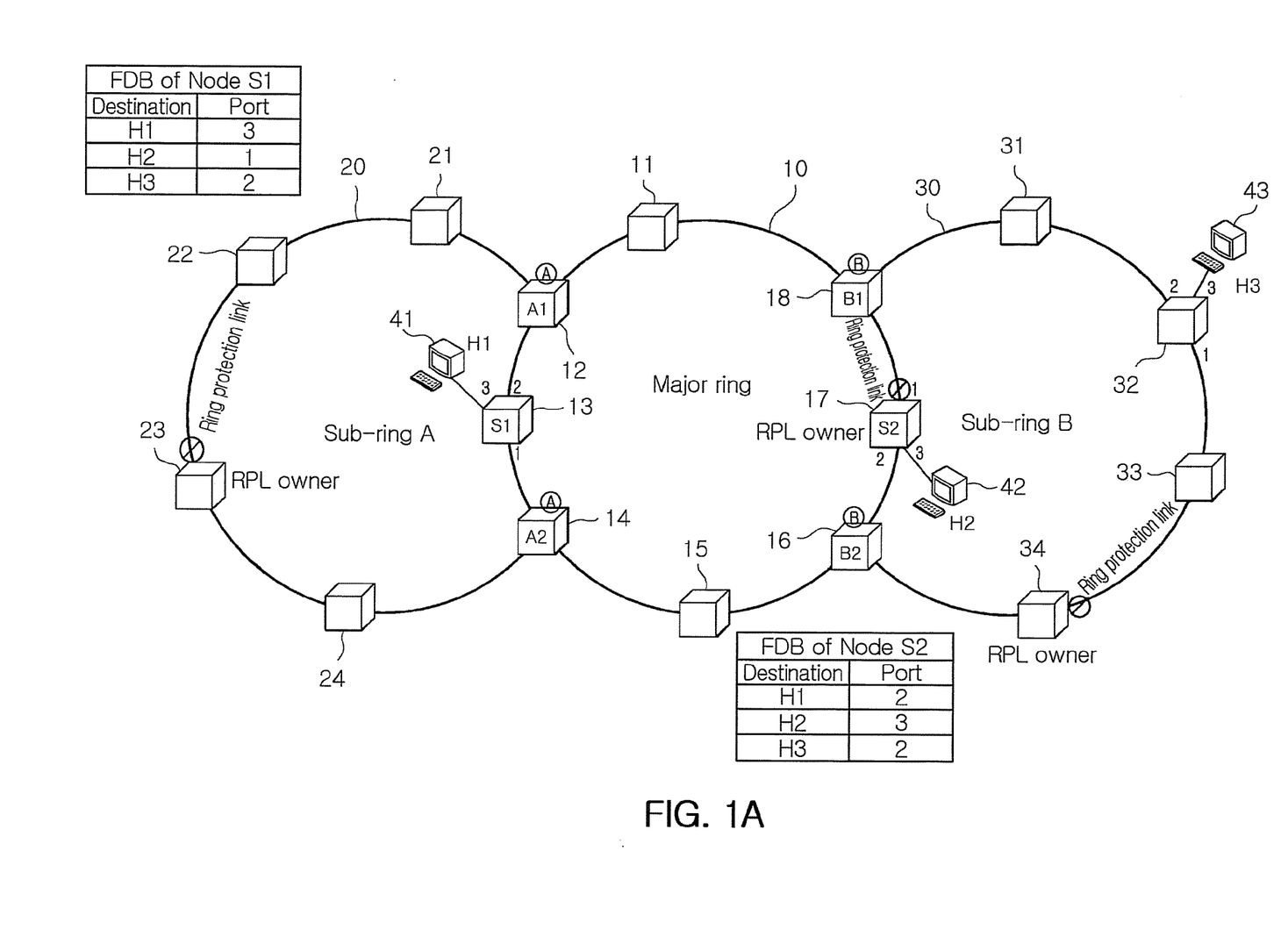
FIGS. 1A to 1C illustrate an example of the process of protection switching when an error occurs in a multi-Ethernet ring network.
Figure 1B:
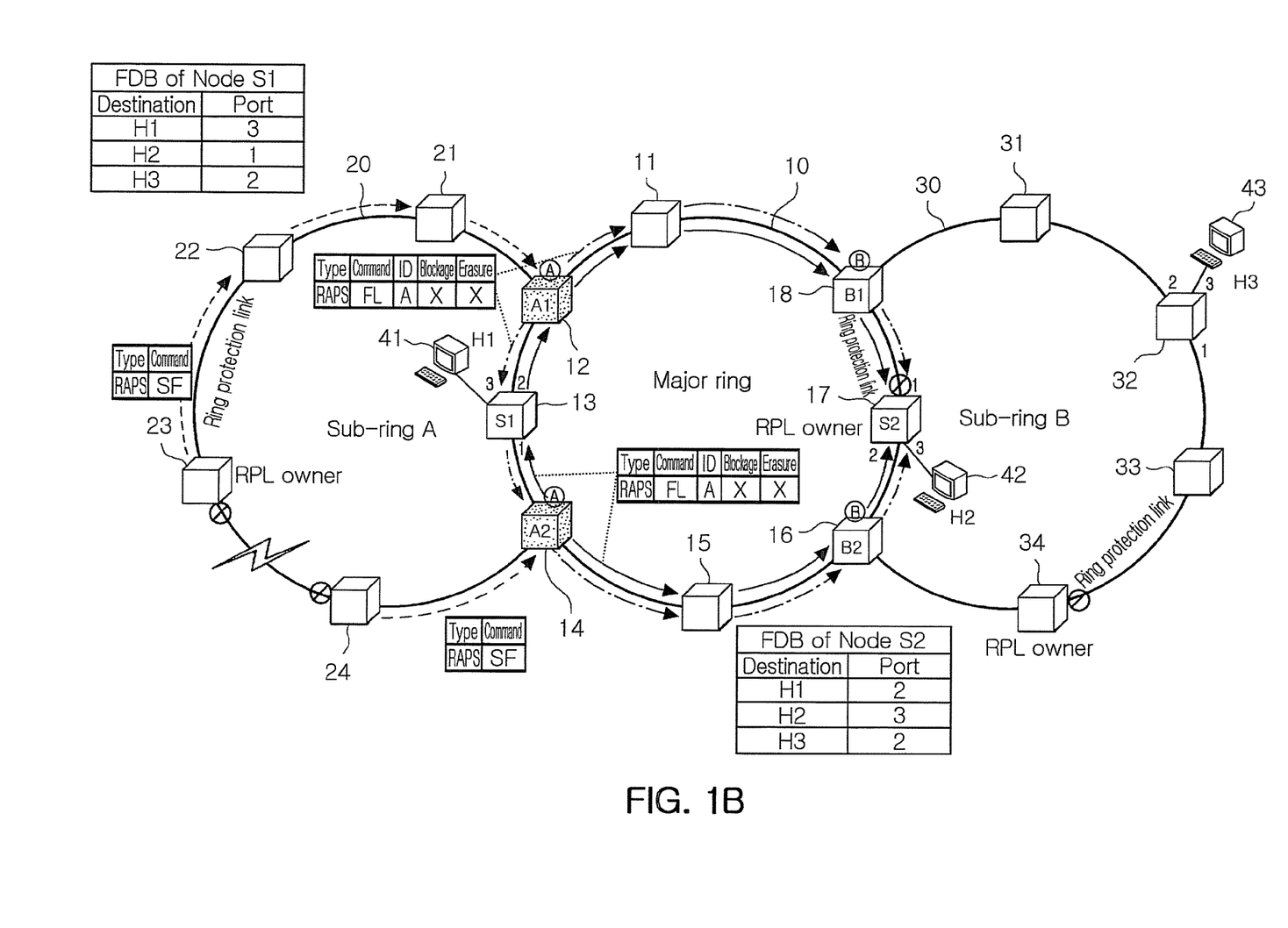
Figure 1C:
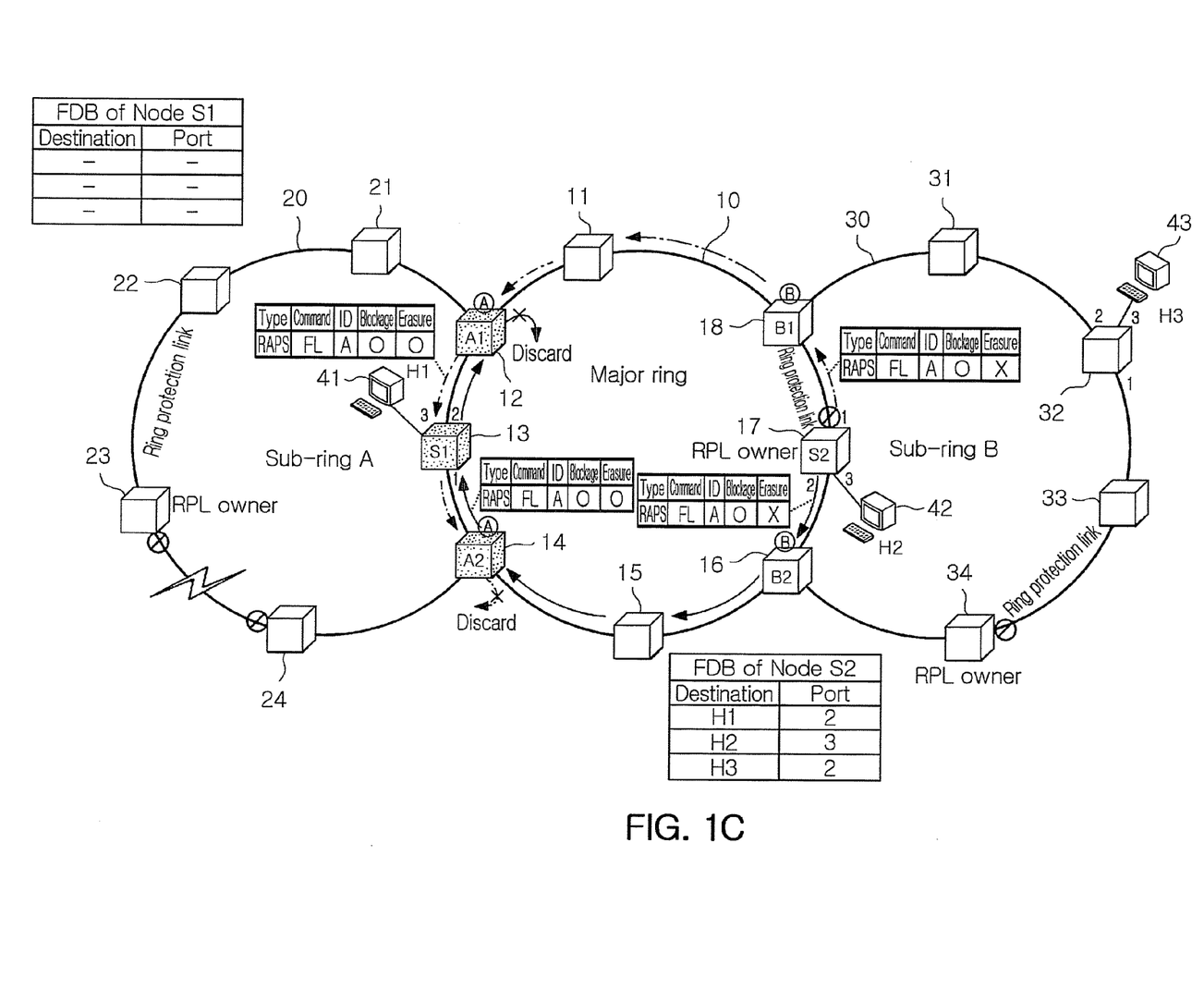

FIGS. 1A to 1C illustrate an example of the process of protection switching when an error occurs in a multi-Ethernet ring network.

With reference to FIG. 1A, two sub-rings A and B, 20 and 30, are connected to a single major ring 10, establishing a multi-Ethernet ring network. The major ring 10 includes eight ring nodes 11 to 18, and the sub-rings A and B, 20 and 30, include four ring nodes 21 to 24 and 31 to 34, respectively.

The major ring 10 and the sub-ring A 20 are connected by ring connection nodes A1 and A2, 12 and 14, belonging to the major ring 10, and the ring connection nodes A1 and A2 store ring ID information (A) regarding the sub-ring A 20. Likewise, the major ring 10 and the sub-ring B 30 are connected by ring connection nodes B1 and B2, 18 and 16, belonging to the major ring 10, and the ring connection nodes B1 and B2, 18 and 16, store ring ID information (B) of the sub-ring B 30. Here, the individual pieces of ring ID information retained by the respective ring connection nodes are stored in the form of a table, and may be the same as a VLAN ID arbitrarily assigned by a network operator and so on in order to manage each ring network.

The RPL owner nodes 17, 23, and 34, existing in the respective Ethernet ring networks, logically block a port connected to the RPL to prevent an infinite loop within the network, including multiple rings.

The multi-Ethernet ring network includes three client nodes H1, H2, and H3, 41, 42, and 43, and the nodes H1 and H2, 41 and 42, are connected to the major ring 10 and the node H3, 43, is connected to the sub-ring B 30.

In this case, it is assumed that a filtering database for each node has been already created through an Ethernet source address learning process according to the related art. Thus, with respect to a frame which has been received, each node determines a transmission port thereof with reference to a port number corresponding to a frame destination in the filtering database.

With reference to FIG. 1B, when a bi-directional link error occurs at a certain link of the sub-ring A 20, nodes 23 and 24, adjacent to the faulty link, detect the error and set blockage of a corresponding port. The nodes and 24 then generate an RAPS (SF) (Ring Automatic Protection Switching—Signal Fail) frame and multicast it to allow all the nodes belonging to the corresponding ring to recognize the faulty situation. Also, after the error occurs, the filtering database maintained by the ring nodes is no longer valid, so all of the ring nodes 21 to 24 of the sub-ring A 20 that receive the RAPS (SF), including the adjacent nodes 23 and 24 of the faulty link, erase their filtering database.

Through the multicasting of the RAPS (SF), the ring connection nodes A1 and A2, 12 and 14, of the major ring 10 connected to the sub-ring A 20, detect the alteration of the network topology of the sub-ring A 20. In this case, the ring connection nodes A1 and A2, 12 and 14, may include a filtering database address list transferred to the sub-ring A 20, so the ring connection nodes A1 and A2, 12 and 14, erase their filtering database. In addition, the alteration of the network topology of the sub-ring A 20 may affect a frame transfer direction of the nodes belonging to the major ring 10, so the ring connection nodes A1 and A2, 12 and 14, generate an RAPS (FL) (Ring Automatic Protection Switching—Flush) frame and multicast the same so that the filtering databases of the nodes affected by the alteration of the network topology of the sub-ring A 20 can be erased.

The upper ring connected to the sub-ring by the two ring connection nodes may be divided into a section in which there is a blockage and a section in which there is no blockage. In this case, in the multi-Ethernet ring network, the alteration of the topology of the sub-ring means that only the section in which there is no blockage is affected, among the two sections. For example, only the nodes A1, S1, and A2 of the major ring, belonging to the section A1-S1-A2 in which there is no blockage, are affected by the alteration of the topology of the sub-ring, while the remaining nodes, other than the nodes A1, S1, and A2 belonging to the section in which there is a blockage, may not need to alter their filtering database, in spite of the alteration of the topology of the sub-ring. In order for the nodes present in the section of the upper ring in which there is no blockage to erase their filtering table, the nodes of the upper ring must know about the topology of the upper ring in which they belong. However, the nodes of the upper ring are unaware of which section they belong to. Thus, in an exemplary embodiment of the present invention, the ring connection nodes detect the topology of the upper ring by using the RAPS (FL) frame when protection switching is performed, thereby allowing the ring nodes of the upper ring to determine whether or not to erase their filtering database.

The RAPS (FL) frame starts to be transmitted from a ring connection node that first detects the alteration of the topology of the sub-ring. The ring connection node that first detects the alteration of the topology of the sub-ring records the ID information regarding the sub-ring whose topology has been altered, initializes (i.e., non-marks) a blockage and erasure flags, and then transmits the RAPS (FL) frame in both directions of the upper ring.

With reference to FIG. 1B, as the ring connection nodes A1 and A2 12 and 14 detect the alteration of the network topology of the sub-ring A 20, they set a ring ID field included in the RAPS (FL) frame as 'A', and because they are unaware of a port direction in which there is a current blockage, the ring connection nodes A1 and A2, 12 and 14, initialize the marking of the blockage flag and the erasure flag and then multicast the RAPS (FL) frame in both directions of the major ring 10.

According to an exemplary embodiment of the present invention, the blockage flag included in the RAPS (FL) frame can be marked only by a node that owns a blockage, and the erasure flag can be marked only by a ring connection node. Here, when the ring connection node checks the blockage flag, finding it marked, the ring connection node marks the erasure flag, and in the case that the block flag is not marked, the ring connection node allows the erasure flag to remain non-marked. If a node, which is not a ring connection node nor owns a blockage, receives the RAPS (FL) frame, it determines whether or not to erase its filtering database according to whether or not the erasure flag included in the received frame has been marked.

If the upper ring is connected to a plurality of lower rings, the section in which there is a blockage may vary according to the positions of the ring connection nodes connected to the lower rings. Thus, in order to perform proper protection switching according to the section in which there is a blockage, the ring connection nodes store ring ID information regarding the connected lower ring, and a ring connection node that does not have the ring ID information included in the RAPS (FL) frame is regarded as a general ring node, and it cannot mark the erasure flag.

For example, the RAPS (FL) frame transmitted from the ring connection nodes A1 and A2, 12 and 14, have the non-marked erasure flag, so the general ring nodes, upon receiving the non-marked erasure flag, multicast the RAPS (FL) frame in the opposite direction of the ring without processing it. Also, the ring connection nodes which receive the RAPS (FL) frame multicast the RAPS (FL) frame in the opposite direction of the ring without processing it since the blockage flag is not marked. Also, when the RAPS (FL) frame is received by the ring connection nodes B1 and B2, 18 and 16, connected to the sub-ring 30, because the ring ID information included in the RAPS (FL) frame and the ring ID information stored in the ring connection nodes B1 and B2, 18 and 16, is different, the ring connection nodes B1 and B2, 18 and 16, operate like general ring nodes. Namely, the ring connection nodes B1 and B2, 18 and 16, determine whether or not to erase their filtering database with reference to the erasure flag and multicast the RAPS (FL) frame in the opposite direction of the ring. Eventually, the RAPS (FL) frame multicast from the ring connection nodes A1 and A2, 12 and 14, is transferred to the RPL owner node S2, 17, that owns a blockage in the major ring 10. In this case, the RAPS (FL) frame transferred to the RPL owner node S2, 17, is not transferred in the opposite direction any longer due to the logical blockage.

With reference to FIG. 1C, because the RPL owner node S2, 17, of the major ring 10 owns a blockage, it marks the blockage flag included in the received RAPS (FL) frame and multicasts the same in both directions of the ring. In this case, the blockage of the RPL owner node S2, 17, is the logical blockage, the RAPS (FL) frame can be also transmitted in the direction in which a blockage exists.

The RAPS (FL) frames, multicast in both directions of the ring from the RPL owner node S2, 17, arrive at the ring connection nodes A1 and A2 12 and 14, respectively. Upon receiving the RAPS (FL) frames with the blockage frame marked, the ring connection nodes A1 and A2, 12 and 14, recognize the existence of the blockage in the port direction from which the frames have been received, mark the erasure flags included in the received frames, and multicast the same in the direction opposite to that from which the frames were received.

Subsequently, the node S1, 13, which has received the erasure flag-marked RAPS (FL) frame, erases its filtering database and multicasts the frame in the opposite direction of the ring.

Thereafter, the RAPS (FL) frames multicast from the ring connection nodes A1 and A2, 12 and 14, are transferred again to A2 and A1, 14 and 12. In this case, if the ring connection nodes A2 and A1, 14 and 12, were to multicast the erasure flag-marked RAPS (FL) frames in the opposite direction of the ring, even the ring nodes, which do not need to erase their filtering database, would erase their filtering database. Thus, in order to prevent this, the ring connection nodes A1 and A2, 12 and 14, discard the received RAPS (FL) frames.

The method for updating a filtering database according to an exemplary embodiment of the present invention can be applicable to a case in which the sub-ring is recovered, as well as to the case in which the sub-ring has an error. Also, when a certain link of the major ring contains an error or when only a single ring connection node detects the alteration of the lower ring, proper protection switching can be performed by utilizing the detection-based RAPS (FL) frame.

Figure 2:
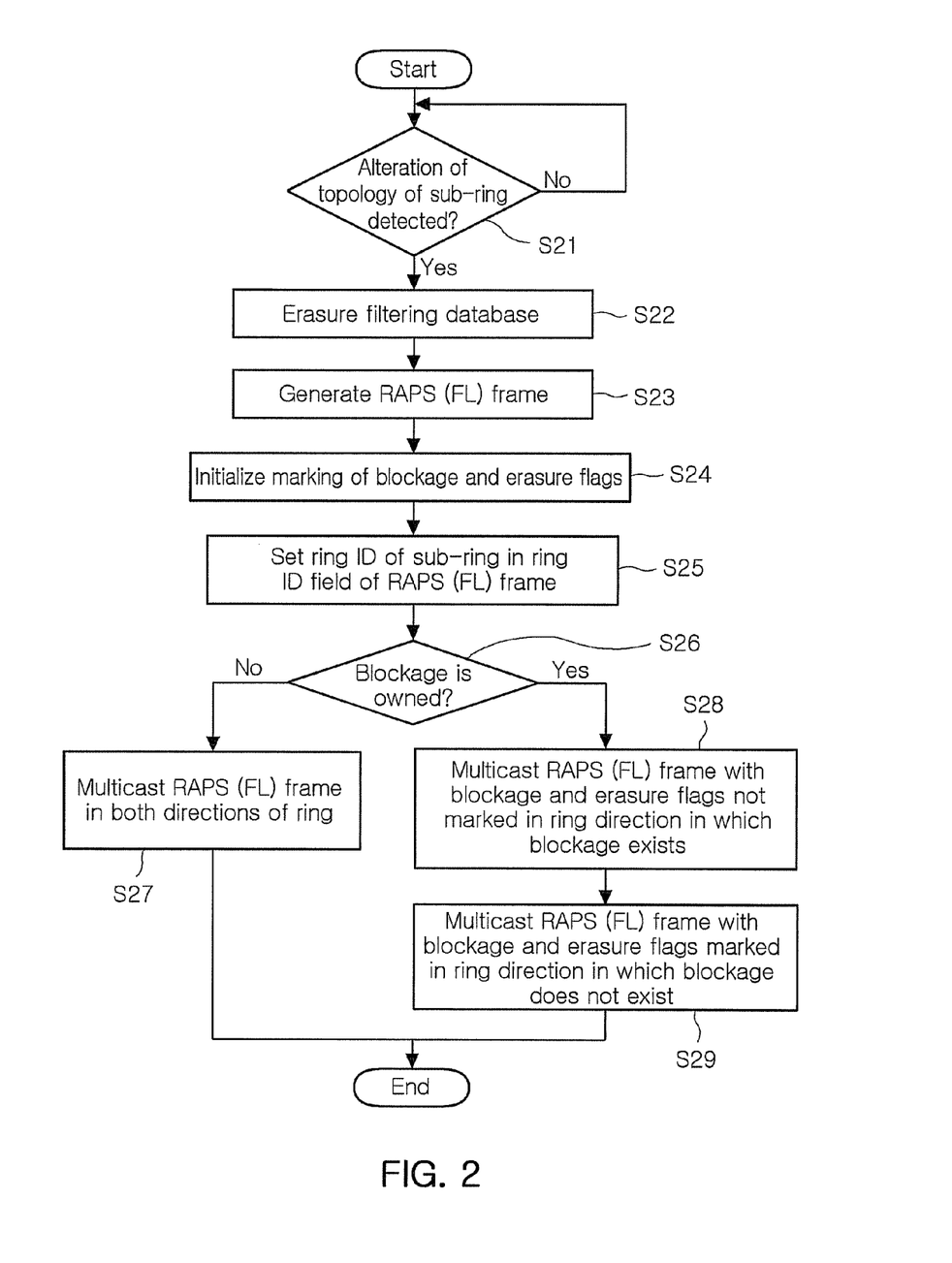
FIG. 2 is a flow chart illustrating the process of multicasting an RAPS (FL) (Ring Automatic Protection Switching—Flush) frame by a ring connection node which has detected an alteration of the topology of a sub-ring according to an exemplary embodiment of the present invention.

FIG. 2 is a flow chart illustrating the process of multicasting the RAPS (FL) frame by a ring connection node which has detected an alteration of the topology of a sub-ring according to an exemplary embodiment of the present invention.

First, when the ring connection node detects the alteration of the topology of the sub-ring (S21), the ring connection node erases its filtering database because the filtering database is no longer valid (S22).

Next, the ring connection node generates an RAPS (FL) frame (S23) in order to inform the nodes of the Ethernet ring to which it belongs the alteration of the topology of the sub-ring, initializes the marking of the blockage flag and the erasure flag included in the RAPS (FL) frame (S24), and sets ring ID information regarding the sub-ring whose topology has been altered in the ring ID field included in the RAPS (FL) frame (S25).

Then, the ring connection node determines whether or not it owns a blockage (S26). If the ring connection node does not own a blockage, because it is unaware of a direction in which a blockage exists, the ring connection node multicasts the RAPS (FL) frame without marking the blockage and erasure flags in both directions of the ring (S27).

Meanwhile, when the ring connection node owns a blockage, because it knows about the direction in which the blockage exists, the ring connection node multicasts the RAPS (FL) frame with the blockage and erasure flags non-marked in the direction in which the blockage exists (S28), and marks the blockage and erasure flags and multicasts the RAPS (FL) frame in the direction in which the blockage does not exist (S29).

Figure 3:
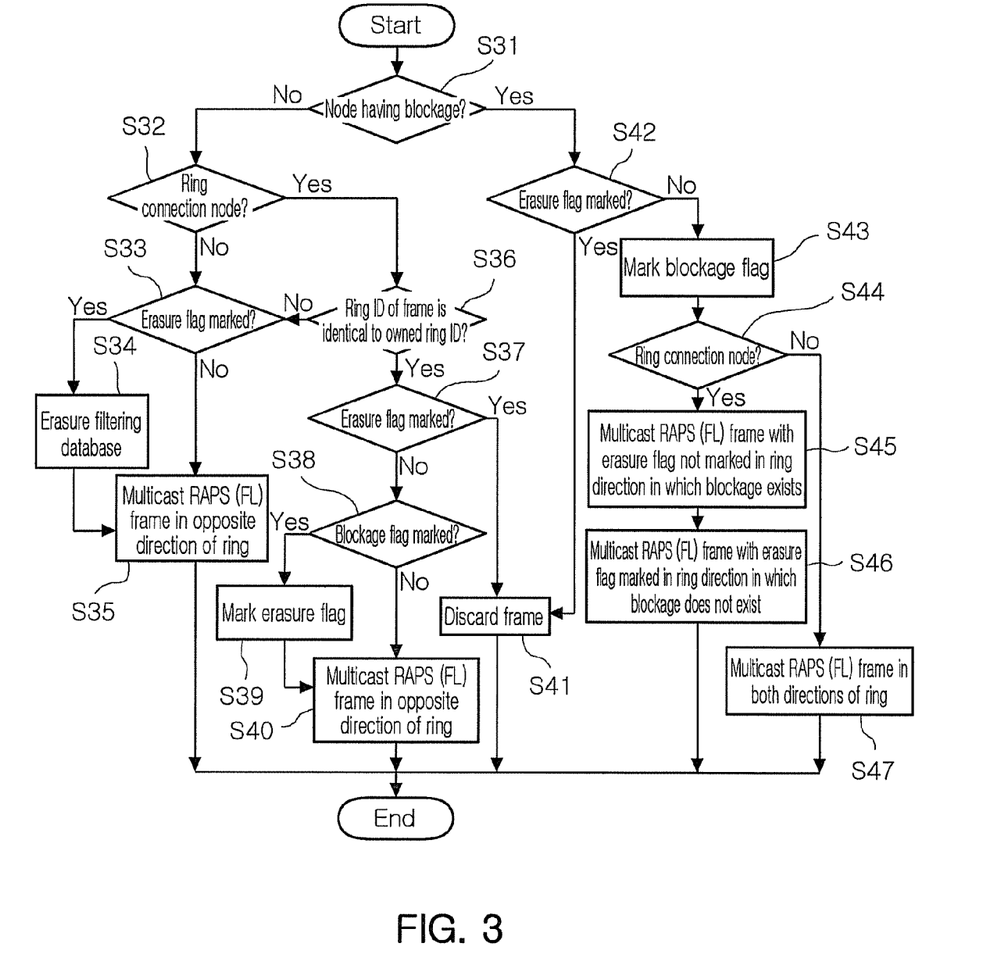
FIG. 3 is a flow chart illustrating the procedure of processing the received RAPS (FL) frame by each node belonging to the multi-Ethernet ring network according to an exemplary embodiment of the present invention.

FIG. 3 is a flow chart illustrating the procedure of processing the received RAPS (FL) frame by each node belonging to the multi-Ethernet ring network according to an exemplary embodiment of the present invention.

First, the node, which has received the RAPS (FL) frame, checks whether or not it owns a blockage (S31).

When the node does not own a blockage, the node checks whether or not it is a ring connection node (S32).

When the node is a general node, rather than a ring connection node, the node checks whether or not the erasure flag included in the received RAPS (FL) frame has been marked (S33). When the erasure flag included in the received RAPS (FL) frame has been marked, the node erases its filtering database (S34) and multicasts the received RAPS (FL) frame in the opposite direction of the ring (S35). Meanwhile, when the erasure flag has not been marked, the node multicasts the received RAPS (FL) frame in the opposite direction of the ring without performing any processing on the received RAPS (FL) frame (S35).

Meanwhile, upon checking in step S32, if the node is a ring connection node, the node checks whether or not a ring ID included in the received RAPS (FL) frame is identical to a ring ID stored in the node (S36). If the ring IDs are not identical, the process flow proceeds to operation s33 so that the node processes the received RAPS (FL) frame in the same manner as the general ring node does. If the ring IDs are identical, the node checks whether or not the erasure flag included in the received RAPS (FL) frame has been marked (s37).

If the erasure flag has been marked, because it means that the filtering databases of the ring nodes existing in the direction of the ring in which the RAPS (FL) frame has been received were already erased, the node discards the received RAPS (FL) frame so that the nodes in the opposite direction of the ring may not erase their filtering database (S41). Meanwhile, when the erasure flag has not been marked, the node checks whether or not the blockage flag included in the received RAPS (FL) frame has been marked (S38). When the blockage flag has been marked, as it means there is a blockage in the direction in which the RAPS (FL) frame has been received, the node marks the erasure flag so that the ring nodes in the opposite direction of the ring can erase their filtering database (S39), and then multicasts the corrected RAPS (FL) frame in the opposite direction of the ring (S40). Meanwhile, when the blockage flag has not been marked, the node multicasts the received RAPS (FL) frame in the opposite direction of the ring without performing any processing on the received RAPS (FL) frame (S40).

Meanwhile, when the node, which has received the RAPS (FL) frame, owns a blockage, it checks whether or not the erasure flag included in the received RAPS (FL) frame has been marked (S42).

When the erasure flag has been marked, as it means that the filtering databases of the ring nodes existing in the direction in which the RAPS (FL) frame has been received were already erased, the node discards the frame (S41). Meanwhile, when the erasure flag has not been marked, the node marks the blockage flag included in the received RAPS (FL) frame (S43) and checks whether or not the node itself is a ring connection node (S44).

When the node is a ring connection node, the node multicasts the RAPS (FL) frame with the erasure flag non-marked in the direction of the ring in which a blockage exists (S45), and marks the erasure flag and multicasts the RAPS (FL) frame in the direction of the ring in which no blockage exists (S46).

Meanwhile, when the node is not a ring connection node in step S44, the node multicasts the corrected RAPS (FL) frame in both directions of the ring (S47).

As set forth above, according to exemplary embodiments of the invention, when the topology of a lower ring network in a multi-ring network in which ring networks are connected by two ring connection nodes, the ring nodes of an upper ring network selectively erase their filtering database. Thus, the overshoot transition phenomenon occurring during protection switching can be minimized, and the use of an unnecessary bandwidth and buffers can be reduced to save resources and cost.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for updating a filtering database maintained by an upper ring when a topology of a lower ring is altered in a multi-ring network in which a plurality of ring networks are connected by two ring connection nodes, the method comprising:
   when a ring connection node detects the alteration of the topology of the lower ring, erasing, by the ring connection node, its filtering database;
   generating, by the ring connection node, a control message including a ring ID, a blockage flag, and an erasure flag; and
   transmitting the control message in both directions of the ring.

2. The method of claim 1, wherein the generating of the control message comprises:
   initializing a marking of the blockage flag and the erasure flag; and
   setting an ID of the lower ring whose topology has been altered in the ring ID field.

3. The method of claim 2, wherein the transmitting of the control message in both directions of the ring comprises:
   when the ring connection node does not have a blockage, transmitting the control message with the blockage flag and the erasure flag not marked in both directions of the ring.

4. The method of claim 2, wherein the transmitting of the control message in both directions of the ring comprises:
   when the ring connection node has a blockage,
   transmitting a control message with the blockage flag and the erasure flag not marked in a direction in which the blockage exists; and
   transmitting a control message with the marked blockage flag and the erasure flag in a direction in which the blockage does not exist.

5. The method of claim 1, wherein the blockage flag of the control message is marked by a node that has a blockage among ring nodes that receive the control message, and the erasure flag is marked by a ring connection node that stores the same ring ID as a ring ID included in the control message among the ring nodes that receive the control message.

6. The method of claim 1, wherein the ring ID information included in the control message is identification information arbitrarily assigned by a network operator for a ring management.

7. A method for updating a filtering database by determining whether to erase the filtering database upon receiving a control message transmitted from a ring connection node which has detected an alteration of a topology of a lower ring in a multi-ring network in which a plurality of ring networks are connected by two ring connection nodes, the method comprising:
   checking, by a ring node which has received the control message, whether the ring node itself is a node having a blockage;
   when the ring node is not a node that has a blockage, checking, by the ring node which has received the control message, that the ring node itself is a ring connection node connected to a lower ring whose topology has been altered;
   when the ring node is not a ring connection node connected to the lower ring whose topology has been altered, checking, by the ring node which has received the control message, whether or not an erasure flag included in the control message has been marked;
   when the erasure flag has been marked, erasing, by the ring node which has received the control message, its filtering database; and transmitting the control message in a direction opposite to the direction in which the control message has been received.

8. The method of claim 7, further comprising:

when the erasure flag of the control message has not been marked, transmitting, by the ring node which has received the control message, the control message in the direction opposite to the direction in which the control message has been received, without erasing its filtering database.

9. The method of claim 7, further comprising:

when the ring node which has received the control message is a ring connection node connected to the lower ring whose topology has been altered, checking, by the ring node which has received the control message, whether or not the erasure flag included in the control message has been marked;

when the erasure flag has not been marked, checking, by the ring node which has received the control message, whether or not a blockage flag included in the control message has been marked;

when the blockage flag has been marked, marking, by the ring node which has received the control message, the erasure flag included in the control message and transmitting the control message in the direction opposite to the direction in which the control message has been received; and when the blockage flag has not been marked, transmitting the control message in the direction opposite to the direction in which the control message has been received.

10. The method of claim 9, further comprising:

when the erasure flag has been marked, discarding the control message.

11. The method of claim 7, further comprising:

when the ring node, which has received the control message, has a blockage, checking, by the ring node which has received the control message, whether or not the erasure flag included in the control message has been marked; and when the erasure flag has been marked, discarding the control message.

12. The method of claim 11, further comprising:

when the erasure flag has not been marked, marking, by the ring node which has received the control message, the blockage flag included in the control message; and transmitting the control message according to whether or not the ring node, which has received the control message, is a ring connection node.

13. The method of claim 12, wherein the transmitting of the control message comprises:

when the ring node, which has received the control message, is a ring connection node, transmitting the control message in a ring direction in which a blockage exists, without marking the erasure flag included in the control message; and marking the erasure flag included in the control message and transmitting the control message in a ring direction in which a blockage does not exist.

14. The method of claim 12, wherein the transmitting of the control message comprises:

when the ring node, which has received the control message, is not a ring connection node, transmitting the control message in both directions of the ring.

* * * * *